No. 705,408. Patented July 22, 1902.
C. E. HUTCHINGS, J. A. ROBERTSON & A. MUTSCHLER.
MAGAZINE CAMERA.
(Application filed Apr. 4, 1902.)
(No Model.) 5 Sheets—Sheet 1.
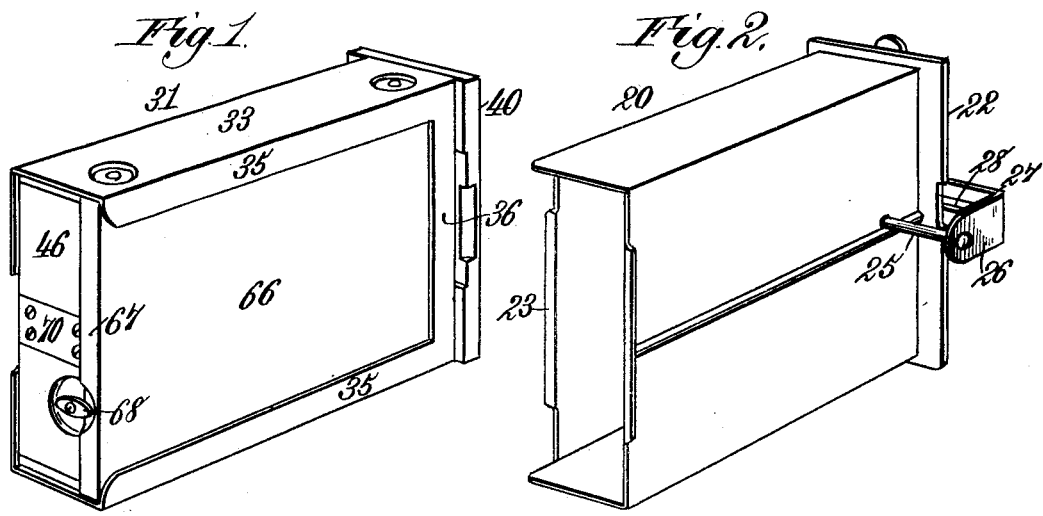
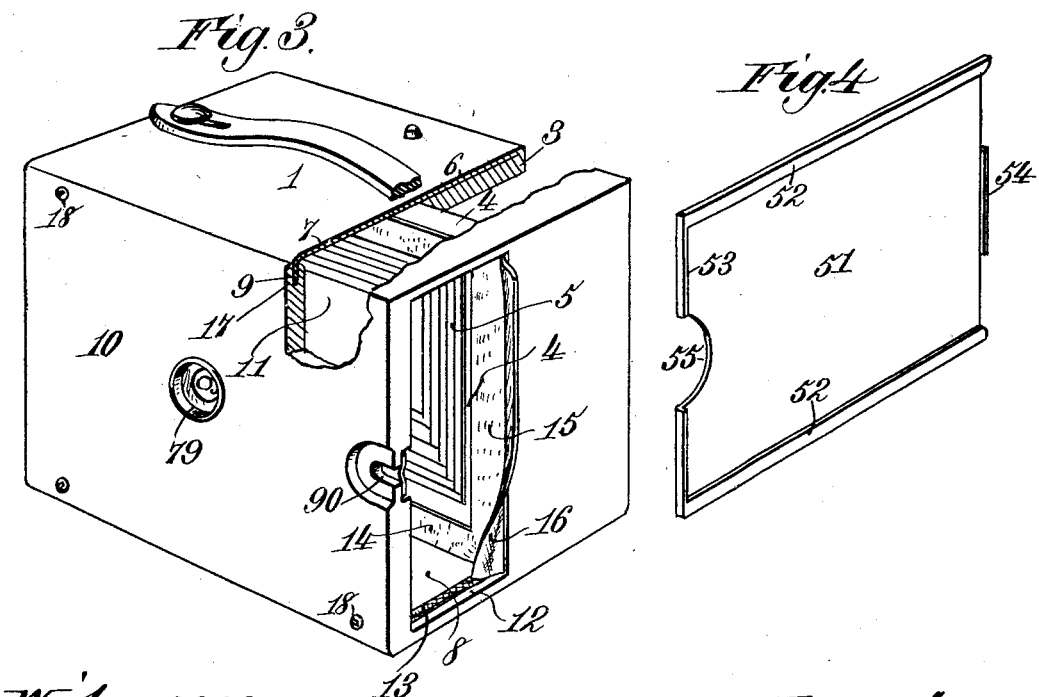
Witnesses:
Inventors
Charles E. Hutchings
John A. Robertson
Albert Mutschler
By James L. Norris
Atty.

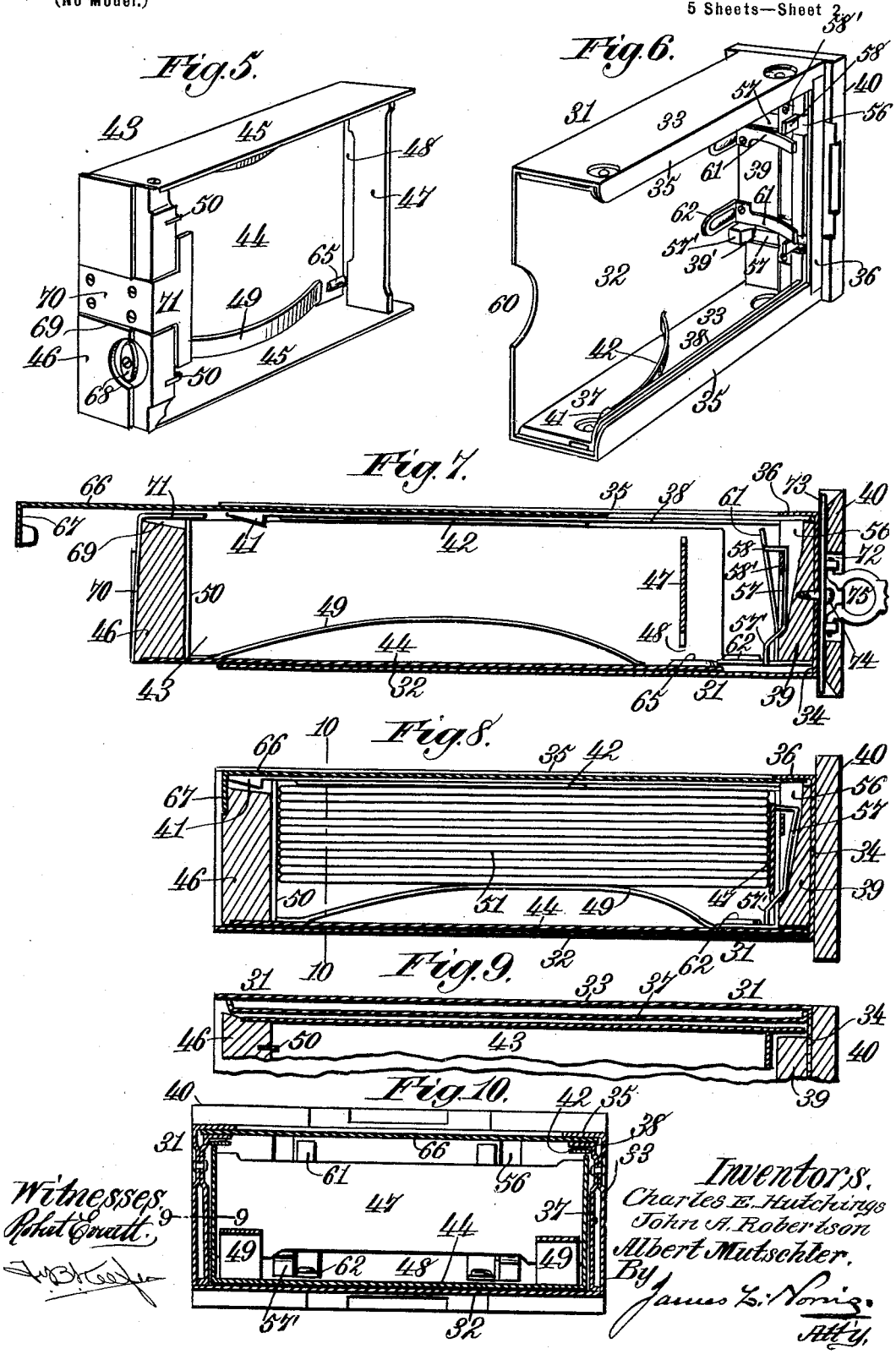

No. 705,408. Patented July 22, 1902.
C. E. HUTCHINGS, J. A. ROBERTSON & A. MUTSCHLER.
MAGAZINE CAMERA.
(Application filed Apr. 4, 1902.)
(No Model.) 5 Sheets—Sheet 3.
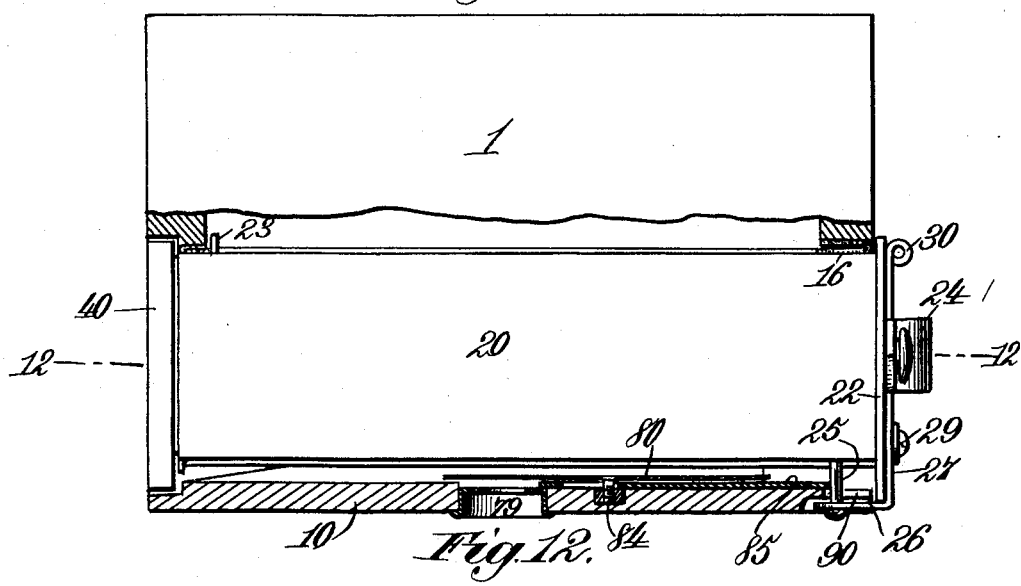
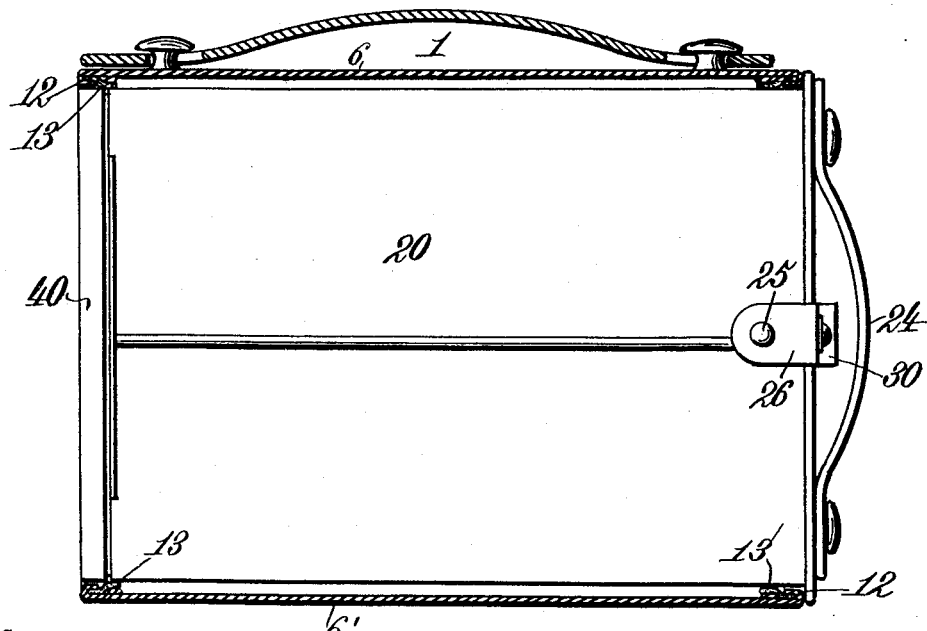
Witnesses. Inventors.
Charles E. Hutchings
John A. Robertson
Albert Mutschler.
By James L. Norris.
Atty.

No. 705,408. Patented July 22, 1902.
C. E. HUTCHINGS, J. A. ROBERTSON & A. MUTSCHLER.
MAGAZINE CAMERA.
(Application filed Apr. 4, 1902.)
(No Model.) 5 Sheets—Sheet 4.
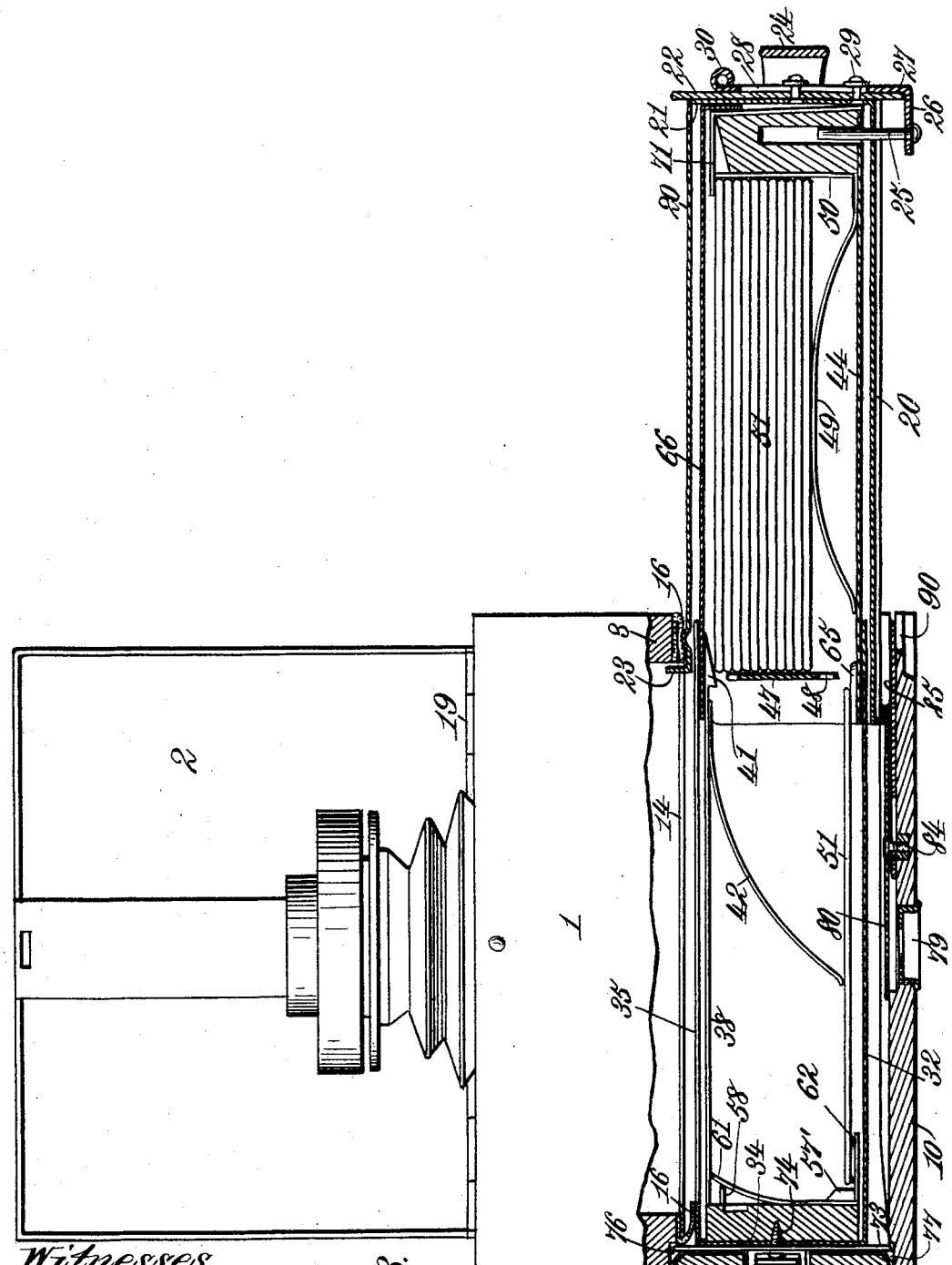

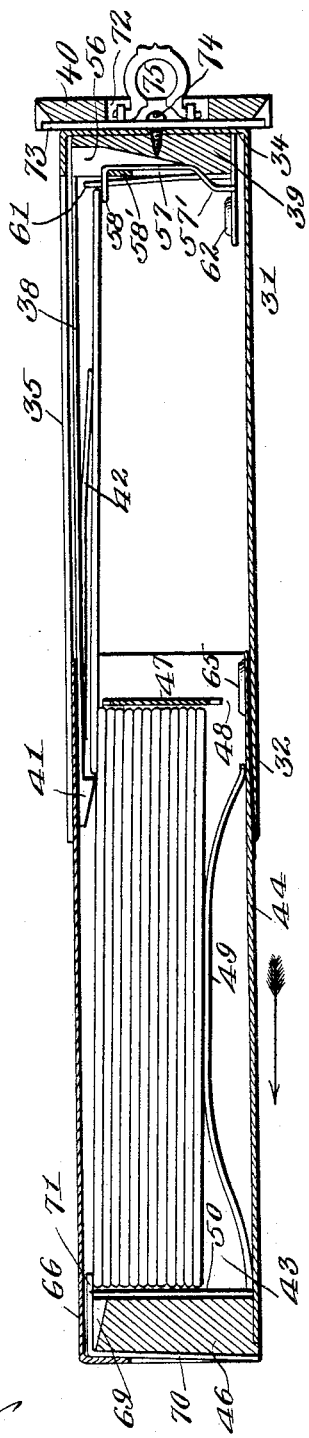

UNITED STATES PATENT OFFICE.

CHARLES E. HUTCHINGS, JOHN A. ROBERTSON, AND ALBERT MUTSCHLER, OF ROCHESTER, NEW YORK, ASSIGNORS TO ROCHESTER OPTICAL AND CAMERA COMPANY, OF ROCHESTER, NEW YORK, A CORPORATION OF NEW YORK.

MAGAZINE-CAMERA.

SPECIFICATION forming part of Letters Patent No. 705,408, dated July 22, 1902.

Application filed April 4, 1902. Serial No. 101,393. (No model.)

*To all whom it may concern:*

Be it known that we, CHARLES E. HUTCHINGS, JOHN A. ROBERTSON, and ALBERT MUTSCHLER, citizens of the United States, residing at Rochester, in the county of Monroe and State of New York, (and whose post-office addresses are Rochester, New York,) have invented certain new and useful Improvements in Magazine-Cameras, of which the following is a full, clear, and exact specification.

This invention relates to magazine-cameras, and has for its object to provide a camera with a novel, simple, and compact magazine adapted to receive a plurality of sensitized plates or films and so constructed and arranged that by merely drawing out a drawer-like inclosing casing from the camera-box and pushing it back to place the plates or films may be successively and automatically moved into correct position for exposure and after exposure stored away in the magazine until it is desired to remove and develop them or pack them up in readiness for development.

It also has for its object to provide a novel and improved magazine of the character described which may be safely removed from the camera in sunlight without subjecting the exposed plates or films to the action of the light and which in like manner can be loaded in the dark room and safely carried out into the light and placed in the camera.

It has for a still further object to so construct a magazine of the character referred to that it may be interchangeably used with either plates or films.

The invention also has for its object to improve the construction of the camera-casing in such manner that the parts will not be affected by atmospheric changes in such manner as to admit light about the magazine or cause the latter to work with difficulty.

Finally it has for its object to improve and simplify the construction and render more efficient the operation generally of this class of cameras.

To these several ends our invention consists in the features and in the construction, combination, and arrangement of parts hereinafter described, and particularly pointed out in the claims following the description, reference being had to the accompanying drawings, forming a part of this specification, wherein—

Figure 1 is a perspective view of the magazine removed from the camera, the lid or cover being shown in place to exclude the light. Fig. 2 is a similar view of the sliding magazine-casing, showing the same detached from the camera. Fig. 3 is a similar view of the camera, partially broken away, the magazine being removed. Fig. 4 is a detail perspective view of one of the plate or film holders. Fig. 5 is a perspective view of the magazine-plate-holder carrier. Fig. 6 is a similar view of the exposing-tray. Fig. 7 is a horizontal longitudinal sectional view illustrating the plate-holder carrier partially withdrawn from the exposing-tray, the sliding lid or cover being also partially withdrawn. Fig. 8 is a view showing the plate-holder carrier wholly within place in the exposing-tray. Fig. 9 is a longitudinal sectional view taken on the line 9 9 of Fig. 10. Fig. 10 is a transverse sectional view taken on the line 10 10 of Fig. 8. Fig. 11 is a top plan view, partially in section, of the magazine portion of the camera. Fig. 12 is a sectional view taken on the line 12 12 of Fig. 11, the magazine being shown in rear elevation. Fig. 13 is a top plan view of the camera in position for effecting an exposure, the magazine being shown in section. Fig. 14 is a sectional view illustrating a plate-holder carrier partially withdrawn from the exposing-tray and showing the foremost plate about to be transferred from the front to the rear of the magazine.

The camera-casing comprises a rectangular box 1, open at its front end and provided with a drop-front or hinged bed 2 in the well-known manner, said drop-front being hinged to the bottom of the camera-box and arranged to close the open front end thereof when raised to a vertical position and when dropped to a horizontal position operating to form a bed on which is adapted to travel the lens-carriage, as usual. The body of the camera-casing consists of a rectangular wooden casing 3, forming a chamber in which when the camera is closed the bellows, the lens-carriage, the lens-shutter, and lens-carriage adjusting mechanism and similar parts are adapted to be housed. The wooden rectangular casing 3 not only serves to afford strength and rigidity to the camera-casing, but it also serves as a convenient means for the attachment of the focusing and lens-adjusting attachments and the supports for holding the drop-front in horizontal position. Said rectangular casing is open at its front and rear ends, and to its rear end is affixed a rectangular wooden frame 4, constituting a bellows-frame, to which the rear end of the bellows 5 is attached in any convenient manner. To the top and bottom of the wooden casing 3 are suitably attached an outer top and bottom 6 and 6', each consisting of a thin sheet of metal, aluminium being preferably employed on account of its lightness. The top and bottom plates 6 and 6' are extended horizontally rearward of the casing 3 to form extensions 7 and 8, the rear ends of said extensions being bent inward at a right angle toward one another, as indicated at 9, to form a convenient means for the attachment of the back 10 of the camera. The extensions 7 and 8 and back 10 form a chamber 11, open at its opposite ends or sides for the reception of the magazine. As will be hereinafter explained, the magazine comprises a rectangular box that is adapted to snugly fit within the magazine-chamber 11, and for the purpose of excluding the light from between the magazine and the inclosing casing we provide the following means: The opposite side edges of the extensions 7 and 8 are bent or folded over upon themselves to form retaining-flanges 12, and clamped between said flanges and said extensions are narrow strips of felt or other fabric 13, which engage the top and bottom of the magazine and prevent the entrance of light. Strips of felt 14 and 15 are also attached to the rear portions of the bellows-frame 4, and the vertical strips 15 are folded or doubled upon themselves, as at 16, (see Figs. 11 and 13,) whereby the light is effectually excluded at the sides of the magazine-chamber. The back consists of a wooden board 10 of the proper size and shape, provided on its upper and lower edges with longitudinal grooves 17, in which the flanges 9 of the extensions are fitted, whereby the back is fixed to the extensions light-tight, and said back may be securely fixed in place by means of screws 18, which pass through said back and the flanges 9. The drop-front or hinged bed 2 is also preferably made from a sheet of aluminium and is secured to the metallic bottom 6' of the camera-casing by a hinge 19. In practice the entire casing is preferably covered with leather or leatheroid to give it a finished appearance. In the construction described above the wooden portion of the camera-casing affords strength and rigidity to the camera, while the metallic extensions forming the magazine-chamber are unaffected by atmospheric changes. Heretofore in cameras of this type constructed of wood great difficulty has been experienced owing to the fact that the wood is quickly affected by atmospheric changes, causing the magazine either to become loose and allow the entrance of light or to shrink, so that it becomes wholly impossible or at least very difficult to properly operate the magazine. By constructing the camera-casing in the manner described these objections are avoided.

The magazine proper comprises three principal parts—namely, a plate-holder carrier for containing the plate-holders in which are inserted the plates or films, the exposing-tray in which the plate-holder carrier is slidably arranged, and a sliding inclosing case which incloses both the plate-holder carrier and the exposing-tray. These parts are constructed and arranged in the manner which will now be described.

Slidably arranged in the magazine-chamber is the sliding inclosing case 20, consisting of a rectangular casing made of sheet metal bent up preferably from a single blank to form the top and bottom, the opposite sides, and one end of said casing. To the end 21 of said casing is screwed, riveted, or bolted a rectangular piece of metal 22, which projects on all sides slightly beyond the end of the casing 20, as shown, so that when said casing is pushed into place within the exposing-chamber 11 said extended edges of the metal end 22 will cover the space between said casing and the sides of the magazine-chamber. The inner end of the inclosing casing 20 is wholly open, as shown, and one edge of said open end of the casing is bent at a right angle to form a flange 23, which when the casing is drawn out to its full limit abuts against the inner side of the wooden casing 3 and prevents the entire withdrawal of the said casing from the magazine-chamber. To the outer side of the metal end 22 of the inclosing casing 20 is attached a strap or handle 24, by which the said casing may be conveniently withdrawn from the magazine-chamber. Projecting into the outer end of the casing 20 through a suitable aperture formed in the rear side thereof is a sliding bolt 25, attached at its outer end to a flange 26, formed on the rear end of a sliding plate 27, that is slidably arranged on the outer side of the wooden end 22, said plate being longitudinally slotted, as at 28, (see Fig. 2,) and is movably secured to said end by screws or bolts 29, which pass through said slot and the end 22 of the casing. The plate 27 is provided with a handle or projection 30, by means of which it may be readily slid back and forth to project the bolt 25 into and retract it from the interior of the inclosing casing 20 for the purpose hereinafter explained.

Slidably fitted within the inclosing casing 20 is the exposing-tray 31, consisting of a rectangular tray bent up from sheet metal and comprising a back 32, forwardly-projected top and bottom 33, and an end 34. These parts are preferably struck up from a single integral blank of sheet metal, the top and bottom being bent at their free edges at right angles to form vertical flanges 35 and the end 34 being bent in similar manner to form a flange 36, lying in the same plane with the flanges 35. Riveted or otherwise suitably attached to the inner sides of the top and bottom 33 are correspondingly-shaped lining-strips of sheet metal 37, the forward edges of said strips being bent inward at right angles toward one another to form vertical flanges 38, said flanges being slightly separated from and parallel with the flanges 35, before referred to. To the inner side of the end 34 of the tray 31 is securely attached in any suitable manner a lining 39, of wood, and to the outer side of said end 34 is attached a rectangular wooden end piece 40, the edges of which project slightly beyond the corresponding edges of the tray 31, as shown, to fit against the side of the camera when the magazine is in place. Beveled projections 41 are fixed to the inner sides of the inner ends of the flanges 38 to form shoulders, and attached to said flanges immediately adjacent to said projections are the ends of two leaf-springs 42, the free ends of which press toward the rear side or back of the exposing-tray.

The numeral 43 indicates the magazine-plate-holder carrier, which consists of a thin sheet-metal tray comprising a back 44 and top and bottom 45, preferably constructed from a single integral sheet of metal bent up into the shape shown, and between the outer end portions of the back 44 and top and bottom 45 is secured a block of wood 46, which forms the outer end of the tray. In the inner or opposite end portions of the top and bottom 45 of the tray is secured a transverse partition 47, which forms the inner end of said tray, a space 48 intervening between the rear edge of said partition and the back 44 of the tray. Leaf-springs 49 are attached at their outer ends to the inner side of the outer end of the back 44, said springs being arranged at the top and bottom of the plate-holder carrier, as most clearly shown in Fig. 5, the free ends of said springs pressing rearwardly toward the back of the said carrier. The plate-holder carrier 43 is adapted to be slidably fitted within the exposing-tray 31 and may be entirely withdrawn from the latter. Fitted in the inner side of the outer wooden end 46 of the plate-holder carrier are two horizontal metal strips 50, said strips projecting slightly beyond the inner face of said wooden end for the purpose hereinafter explained. The plates or films preparatory to being loaded into the carrier 43 are each inserted in a suitable plate-holder—such, for example, as shown in Fig. 4—said plate-holder consisting of a rectangular flat sheet of metal 51, bent at its opposite side edges to form overhanging flanges 52 and bent up at its ends to form right-angled flanges 53 and 54. The plate or film is slipped within the plate-holder in such manner that the opposite side edges of the plate or film will rest under the overhanging flanges 52, and the ends of said plate or film will be confined between the right-angled flanges 53 and 54. Each of the plate-holders at one end is provided with a recess or finger-aperture 55 for the purpose of enabling the plate or film to be readily grasped between the finger and thumb for insertion in and removal from the plate-holder.

In practice the magazine will be provided with a suitable number of plate-holders to hold a box of plates or twenty-four films. The plate-holders containing the plates or films are placed within the plate-holder carrier, the plates or films being disposed toward the open side of said carrier, and the pile of plate-holders will rest against the springs 49, which will exert a pressure thereagainst to press the plate-holders forward toward the open side of the carrier. After the plate-holders have been placed in the carrier in the manner described the latter is then slipped within the exposing-tray 31, and the springs 49 will operate to press the plate-holder forward in such manner that the foremost plate-holder will rest at its upper and lower edges against the inner sides of the flanges 38 in the exposing-tray, the free ends of the springs 42 bearing against the forward upper and lower edges of the foremost plate-holder.

Formed in the face of the inner side of the wooden end 39 of the exposing-tray are two grooves 56, which gradually increase in depth from their rear ends forward, and disposed in front of said grooves are two yielding plate-holder supports constructed as follows: Attached to the inner side of the end 39, adjacent to the grooves 56, are two metallic plates 39', each having formed integrally therewith a forwardly-projecting spring-arm 57, bent at its free end at a right angle to form a finger 58, that projects inward from the face of the end 39. Keepers consisting of metallic strips 58' are attached to the end 39 and bridge the grooves immediately in rear of the spring-fingers 58 and limit the movement of the latter. Also formed integrally with each of the plates 39' is a horizontal spring 61, that projects at its free end beyond the adjacent finger 58 and slightly away from the face of the end 39, and formed integrally with and projecting at a right angle from each of the plates 39' is a spring-finger 62, that lies a slight distance in front of and parallel to the back 32 of the exposing-tray. When the plate-holder carrier holding the plate-holders is inserted in the exposing-tray, the end 47 of the carrier will abut the ends of the fingers 58 and will cause the latter and the spring-arms 57 to recede within the grooves 56. The foremost plate-holder will then by the action of the springs 49 be held against the inner sides of the flanges 38 and will rest at its inner end behind the shoulders 41, before referred to. After the plate-holder has been properly loaded and slipped within the exposing-tray the two are then inserted within the inclosing casing 20 in the magazine-chamber 11, the slide 27 having been first moved rearwardly to withdraw the sliding pin or bolt 25 from without the casing 20. A small hole 59 is formed in the inner end of the back of the plate-holder carrier for the reception of the bolt 25, and a corresponding aperture 60 is formed in the end of the exposing-tray to permit of the entrance of said bolt into said hole. When the magazine is inserted within the inclosing casing 20, the slide 27 is pushed forward, causing the bolt 25 to enter the hole 59 in the carrier and lock said carrier in place within the inclosing casing, so that the two are caused to move together. When the magazine-casing 20 is drawn out endwise from the magazine-chamber 11, the plate-holder carrier 43 is drawn out with it, carrying with it all the plate-holders excepting the foremost one, which is prevented from being drawn out with each carrier by the shoulders 41. As the carrier and plate-holders (excepting the foremost one) are drawn out the fingers 58 move with the carrier until arrested by the keepers 58' and move behind the foremost plate-holder, and after the carrier has been moved about one-half way out of the exposing-tray the springs 42 will press the inner end of the foremost plate-holder against the fingers 58, and said plate will then be supported at one end by said fingers and at its other end by the forward edge of the partition 47 of the carrier. When, however, the magazine-casing and the plate-holder carrier have been drawn out to the full extent of their outward movement, the said partition will be withdrawn from behind the foremost plate-holder and will deprive said last-mentioned holder of its support, whereupon the springs 42 will immediately press said foremost plate-holder rearwardly and will push the end of said plate-holder from behind the shoulders 41, whereupon the springs 61 will immediately move said plate-holder lengthwise a suitable distance to cause it to clear the fingers 58, and the springs 42 will then operate to quickly force the plate-holder against the rear of the exposing-tray. When the plate-holder is forced rearwardly by the springs 42, one end of said holder will rest against the spring-fingers 62 and the other end against the inner end of the back 44 of the plate-holder carrier. The plate-holder will thus be accurately held in position relatively to the lens, so as to place the plate or film in correct focus.

As most clearly shown in Fig. 6 of the drawings, the rear portions of the spring-arms 57 are offset, as at 57', whereby when the carrier is pushed back in the exposing-tray said offset portions will engage the inner end of the plate-holder and push it behind the partition 47 in such manner that said end of the plate-holder will not hang behind the rear edge of said partition.

After the magazine-casing and the plate-holder carrier have been drawn out from the camera-casing and the foremost plate has been pressed to the rear of the exposing-tray the plate or film carried by the said plate-holder may then be exposed in the usual manner to take the picture. The magazine-casing and the plate-holder carrier are then pushed back within the camera-casing, and as the plate-holder carrier moves back within the exposing-tray the plate-holder carrying the plate or film that has been exposed passes through the aperture 48 in the plate-holder carrier and in front of the springs 49, and after the plate-holder carrier has been restored to its former position the plate-holder carrying the exposed plate or film will rest at the back or rear of the package of plate-holders, and another plate-holder carrying an unexposed plate or film will rest behind the flanges 38 and behind the shoulders 41 in readiness to be moved by springs 42 into the focal plane of the camera when the magazine-casing is again drawn out. As the plate-holders are pressed forward by the springs 49 their ends will ride forward on the metal strips 50, before referred to, which constitute rails or guides to guide the plates in their forward movement and prevent them from having too great frictional contact with the end 46 of the plate-holder carrier. In practice each camera will preferably be provided with two magazines, one for holding plate-holders carrying films and the other for holding plate-holders carrying plates, the only difference between the two being that in the film-magazine the plate-holder carrier will be provided at the inner end of the inner side of its back 44 with raised projections 65 and the spring-fingers 62 will project slightly farther forward in the film-magazine than the corresponding fingers in the plate-magazine, the arrangement being such that when the plate-holder carrying the film is forced to the rear of the exposing-tray by the springs 42 the ends of said plate-holder will respectively rest against the spring-fingers 62 and the raised projections 65, and the film will be held in the same plane relatively to the lens that the plate would be held in, for owing to the difference in thickness between the film and its plate-holder and a plate and its plate-holder means must be provided for holding the plate-holder carrying the film slightly farther away from the back 32 of the exposing-tray than the plate-holder carrying a plate would be held to compensate for the said difference in thickness, so that a film and a plate will both be held in the same vertical plane when either is employed, and this is accomplished by means of the spring-fingers 62 and the raised projections 65 in the manner before set forth.

The numeral 66 indicates a sliding lid or cover consisting of a rectangular sheet of metal provided at its outer end with a rearwardly-turned flange 67, said lid or cover being adapted to be slipped into place between the flanges 37 and 38 of the exposing-tray to close the front open side of the latter and exclude the light therefrom. The flange 67 extends partially over and rests against the outer face of the end 46 of the plate-holder carrier. When the plate-holder carrier has been loaded and inserted in the exposing-tray, the lid or cover is slipped into place between the flanges 37 and 38 and is locked therein by turning a button 68. The magazine may now be inserted in the magazine-chamber of the camera, and this may safely be done in sunlight as well as in the dark room. Attached to the outer face of the end 46 of the plate-holder carrier is a button 68, and when the lid or cover has been pushed into place by turning said button it will engage the flange 67 and prevent the lid or cover from being opened. When the magazine is removed from the camera, the lid or cover slipped from place, and the plate-holder carrier withdrawn from the exposing-tray, one of the plate-holders, with its plate or film, is apt to be left remaining and unnoticed in the exposing-tray, for when the plate-holder carrier is withdrawn from the exposing-tray, carrying with it the plate-holders, the foremost plate-holder is held in the exposing-tray by the shoulders 41, and in order to prevent this the following means are provided: Formed in the front edge of the end 46 of the plate-holder carrier is a groove or recess 69, and attached to the outer face of said end is a metallic plate 70, which at its free end is bent at a right angle, as at 71, to the fixed portion of said plate, said bent portion resting in said groove or recess and projecting over the end of the open front of the plate-holder carrier. When the plate-holder carrier with its contained plate-holders is to be withdrawn from the exposing-tray, the operator places his thumb upon the bent portion 71 of the said plate-carrier, constituting a clasp, and presses it on the foremost plate of the package of plate-holders. This causes the foremost plate to be pushed out of engagement with the shoulders 41 and clasps all the plate-holders together, so that when the plate-holder carrier is withdrawn from the exposing-tray all the plate-holders, including the foremost one, are withdrawn with it and may then be removed from the carrier. The plates or films may then be withdrawn from the plate-holders and developed in the usual manner.

When the magazine is inserted in the magazine-chamber 11, some means must be provided for holding it in place, and for this purpose the following means are provided: Formed in the outer face of the end 40 of the exposing-tray is a recess 72, and movably arranged between the ends 40 and 34 of said exposing-tray is an oscillatory latch 73, which is pivotally secured in place by a pivoted screw 74, which is screwed through said latch and into the wooden end 39 of the tray. A bail or handle 75 is hinged to the latch 73, and by means of said bail the latch may be oscillated about its pivot. The latch is of such length that when turned to a horizontal position or transversely to the exposing-tray its ends will project beyond the sides and front of the latter and will hook behind the catches 76 and 77, formed in the front and rear sides, respectively, of one end of the magazine-chamber and will lock the exposing-tray in said chamber. By means of the handle 75 the latch may be turned to a vertical position, so as to retract its ends within the space between the ends 34 and 40 of the exposing-tray, when the latter may be readily withdrawn from the magazine-chamber. When the bail or handle 75 is not in use, it may be folded down out of the way within the recess 72.

The operation of the camera may be briefly recapitulated as follows: The plate-holders, carrying either plates or films, are first loaded into the plate-holder. The latter is then inserted in the exposing-tray, and the lid or cover is finally slipped into place in the groove between the flanges 37 and 38 of the exposing-tray and is locked in place and to the plate-holder carrier by turning the button 68 to the proper position. All these operations are conducted in the dark room. The magazine is next inserted in the magazine-casing in the magazine-chamber of the camera and the plate-holder carrier is locked to the magazine-casing by the bolt 25, after which the catch 73 is turned to lock the exposing-tray immovably in place in the magazine-chamber. The camera is now in readiness for use. When it is desired to photograph an object or view, the magazine-casing is drawn out from the magazine, drawing out with it the plate-holder carrier and the lid or cover 66. As the plate-holder carrier is drawn out of the exposing-tray, which remains in the magazine-chamber, all the plate-holders excepting the foremost one are withdrawn with it. The foremost plate-holder, however, is held in the exposing-tray by the shoulders 41 and is left resting at its ends against the fingers 58 and the edges of the plate-holder in rear of it until the plate-holder carrier has been withdrawn as far as it will go, at which time the plate-holders carried by the carrier will have been withdrawn wholly from behind the foremost plate-holder, whereupon the end of the latter will be forced out of engagement with the shoulders 41, and the springs 61 will immediately force the plate-holder from off the fingers 58. The instant this occurs the springs 42 will quickly move the plate-holder to the rear of the exposing-tray and hold it in correct position for exposure. The shutter of the camera may now be opened to give the desired exposure to the plate or film, after which the magazine-casing is pushed back into the magazine-chamber, carrying with it the plate-holder carrier and pushing the latter into the exposing-tray. As the carrier is forced into the exposing-tray the back 32 of said carrier moves behind the plate-holder carrying the exposed plate or film and transfers said plate-holder to the rear of the pile of plate-holders carrying the unexposed plates or films and between such plate-holders and the springs 49. At the same time another plate-holder is forced behind the shoulders 41 in readiness to be shifted to the rear of the exposing-tray to make another exposure. Each time the magazine-casing is withdrawn to transfer a plate-holder it actuates the indicator-disk in the manner before described and causes it to present a new numeral to view, the number of plates exposed being thus automatically and unerringly indicated at all times.

For the sake of brevity the term "plate-holder" has been used herein to indicate the holder for holding either a plate or film, and it is to be understood that by such term is meant a holder capable of holding a sensitized surface of any kind suitable for the purpose.

Having described our invention, what we claim is—

1. In a magazine-camera, the combination with the camera-casing having a transverse magazine-chamber therein, of a magazine-casing slidably arranged in said chamber and open at one end only, a stationary exposing-tray removably arranged in said chamber and within the magazine-casing, a plate-holder carrier slidably arranged in the exposing-tray and movable with the magazine-casing, and means for transferring a plate-holder from the front of the carrier to the rear of the exposing-tray when the magazine-casing and carrier are drawn out from the magazine-chamber, substantially as described.

2. In a magazine-camera, the combination with the camera-casing having a transverse magazine-chamber therein, of a magazine-casing slidably arranged in said chamber and open at its inner end only, a stationary exposing-tray removably arranged in said chamber and within the magazine-casing, a plate-holder carrier slidably arranged in the exposing-tray and movable with the magazine-casing, means for transferring a plate-holder from the front of the carrier to the rear of the exposing-tray when the magazine-casing and carrier are drawn out from the magazine-chamber, and means for introducing said plate-holder into the rear part of the plate-holder carrier when the latter is moved back into the magazine-chamber, substantially as described.

3. In a magazine-camera, the combination with the camera-casing having a transverse magazine-chamber therein, of a magazine-casing slidably arranged in said chamber and open at its inner end only, a stationary exposing-tray removably arranged in said chamber and within the magazine-casing, a plate-holder carrier slidably arranged in the exposing-tray, means for detachably locking the carrier to the magazine-casing, and means for transferring a plate-holder from the front of the carrier to the rear of the exposing-tray when the magazine-casing and carrier are drawn out from the magazine-chamber, substantially as described.

4. In a magazine-camera, the combination with the camera-casing having a transverse magazine-chamber therein, of a magazine-casing slidably arranged in said chamber and open at its inner end only, a stationary exposing-tray removably arranged in said chamber and within the magazine-casing, a plate-holder carrier slidably arranged in the exposing-tray and movable with the magazine-casing, means for locking the exposing-tray in the magazine-chamber, and means for transferring a plate-holder from the front of the carrier to the rear of the exposing-tray when the magazine-casing and carrier are drawn out from the magazine-chamber, substantially as described.

5. In a magazine-camera, the combination with the camera-casing having a transverse magazine-chamber therein, of a magazine-casing slidably arranged in said chamber and open at its inner end only, a stationary exposing-tray removably arranged in said chamber and within the magazine-casing, a plate-holder carrier slidably arranged in the exposing-tray and movable with the magazine-casing, a removable cover detachably connected to the plate-holder carrier and slidably arranged in the front of the exposing-tray, and means for transferring a plate-holder from the front of the carrier to the rear of the exposing-tray when the magazine-casing and carrier are drawn out from the magazine-chamber, substantially as described.

6. In a magazine-camera, the combination with the camera-casing having a transverse magazine-chamber therein, of a magazine-casing slidably arranged in said chamber and open at its inner end only, a stationary exposing-tray removably arranged in said chamber and within the magazine-casing, a plate-holder carrier slidably arranged in the exposing-tray, means for locking said carrier to the magazine-casing, means for locking the exposing-tray in the magazine-chamber, a cover detachably connected to the plate-holder carrier and slidably arranged in the front of the exposing-tray, and means for transferring a plate-holder from the front of the carrier to the rear of the exposing-tray when the magazine-casing and carrier are drawn out from the magazine-chamber, substantially as described.

7. In a magazine-camera, the combination with the camera-casing having a transverse magazine-chamber therein, of a magazine-casing slidably arranged in said chamber and open at its inner end only, a stationary exposing-tray open at its front and at its outer end, a removable sliding cover normally closing the open front of said tray, said tray being removable from the magazine-chamber, a plate-holder carrier open at its front and slidably arranged in the exposing-tray, means for locking the carrier to the magazine-casing, means for locking the said cover to the carrier, means for retaining a plate-holder in the front of the exposing-tray when the magazine-casing and the carrier are drawn out, means for automatically releasing said plate-holder and moving it bodily to the rear of the exposing-tray when the carrier is withdrawn from the tray, and means for transferring said plate-holder to the rear of the carrier when the latter is returned to the tray, substantially as described.

8. In a camera the combination with the camera-casing having a transverse magazine-chamber therein, of a magazine-casing slidably arranged in said chamber and open at its inner end only, a stationary exposing-tray removably arranged in said chamber and within the magazine-casing, a plate-holder carrier slidably arranged in the exposing-tray and movable with the magazine-casing, means for transferring a plate-holder from the front of the carrier to the rear of the exposing-tray when the magazine-casing and carrier are drawn out, an indicator, and means carried by said magazine-casing for controlling the indicator, substantially as described.

9. In a magazine-camera, the combination with the camera-casing having a transverse magazine-chamber therein, of a magazine-casing slidably arranged in said chamber and open at its inner end only, a stationary exposing-tray open at its front and at its outer end, a removable sliding cover normally closing the open front of said tray, said tray being removable from the magazine-chamber, a plate-holder carrier open at its front and slidably arranged in the exposing-tray, means for locking the exposing-tray to the magazine-casing, means for locking the said cover to the carrier, means for retaining a plate-holder in the front of the exposing-tray until the magazine-casing and the carrier are drawn out, means for automatically releasing said plate-holder and moving it bodily to the rear of the exposing-tray when the carrier is drawn out from the tray, means for transferring said plate-holder to the rear of the carrier when the latter is returned to the tray, and means for preventing the entire withdrawal of the magazine-casing from the magazine-chamber, substantially as described.

10. In a magazine-camera, the combination with the camera-casing having a transverse magazine-chamber therein, of a stationary exposing-tray removably arranged in said chamber and comprising a casing open at its front and at one end, a plate-holder carrier comprising a casing having an open front, a cover normally closing said front and slidably arranged in the front of the exposing-tray, the said carrier being slidably arranged in the exposing-tray, means for drawing out said carrier from the tray, means for retaining a plate-holder in the front of the exposing-tray until the carrier is drawn out, means for shifting said plate-holder to the rear of the exposing-tray when said carrier is drawn out, and means for transferring said plate-holder to the rear of the carrier when the latter is returned to the tray, substantially as described.

11. In a magazine for cameras, the combination with an exposing-tray comprising a rectangular casing open at its front and one end, of a correspondingly-shaped plate-holder carrier slidably arranged in said tray and comprising a rectangular casing open at its front and provided at its inner end with an aperture for the passage therethrough of a plate-holder, a cover attached to the carrier and covering the front thereof, said carrier and cover being slidably arranged in the exposing-tray, means for retaining a plate-holder in the front of the exposing-tray until the carrier is drawn out, means for shifting said plate to the rear of the tray when the carrier is drawn out, and means for pushing the plate-holder into the rear of the carrier through said aperture when the carrier is returned to the exposing-tray, substantially as described.

12. In a magazine for cameras, the combination with an outer rectangular casing forming an exposing-tray and open at the front and one end, of a plate-holder carrier comprising a rectangular casing having a plate-holder aperture in its inner end, said carrier being slidably arranged in the exposing-tray, and means on the closed end of the exposing-tray for temporarily supporting the inner end of the foremost plate-holder while the plate-holder carrier is being withdrawn from the tray, substantially as described.

13. In a magazine for cameras, the combination with an outer rectangular casing forming an exposing-tray and open at the front and one end, of a plate-holder comprising a rectangular casing having a plate-holder aperture in its inner end, said carrier being slidably arranged in the exposing-tray and spring-fingers on the closed end of the exposing-tray arranged to project between the foremost plate-holder and the plate-holders in rear thereof as the carrier is withdrawn from the exposing-tray and hold said foremost plate-holder, substantially as described.

14. In a magazine for cameras, the combination with a rectangular outer casing forming an exposing-tray and open at the front and one end, of a plate-holder carrier comprising a rectangular casing having a plate-holder aperture in its inner end, said carrier being slidably arranged in the exposing-tray and spring-fingers on the closed end of the exposing-tray arranged to project between the foremost plate-holder and the plate-holders in rear thereof as the carrier is withdrawn from the exposing-tray, and means for automatically forcing said plate-holder out of engagement with said fingers when the carrier is fully drawn out of the exposing-tray, substantially as described.

15. In a magazine for cameras, the combination with a rectangular outer casing forming an exposing-tray and open at the front and one end, of a plate-holder carrier comprising a rectangular casing having a plate-holder aperture in its inner end, said carrier being slidably arranged in the exposing-tray, spring-fingers on the closed end of the exposing-tray arranged to project between the foremost plate-holder and the plate-holders in rear thereof as the carrier is withdrawn from the exposing-tray, and a spring for automatically forcing said plate-holder out of engagement with said fingers when the carrier is fully drawn out of the exposing-tray, substantially as described.

16. In a magazine for cameras, the combination with a rectangular outer casing forming an exposing-tray and open at the front and one end, of a plate-holder carrier comprising a rectangular casing having a plate-holder aperture in its inner end, said carrier being slidably arranged in the exposing-tray, spring-fingers attached to the closed end of the exposing-tray and arranged to project between the foremost plate-holder and the plate-holders in rear thereof as the carrier is withdrawn from the exposing-tray and hold said foremost plate-holder, and springs arranged to force said plate-holder out of engagement with the lug when the carrier is drawn out of the exposing-tray, substantially as described.

17. In a magazine for cameras, the combination with a rectangular outer casing forming an exposing-tray and open at the front and one end, of a plate-holder carrier comprising a rectangular casing having a plate-holder aperture in its inner end, said carrier being slidably arranged in the exposing-tray, two spring-fingers on the closed end of the exposing-tray arranged to project between the foremost plate-holder and the plate-holders in rear thereof as the carrier is withdrawn from the exposing-tray, and springs attached to said closed end between said fingers and constructed to force said plate-holder out of engagement with the fingers when the carrier is drawn out of the exposing-tray, substantially as described.

18. In a magazine for cameras, the combination with an outer casing forming an exposing-tray and open at the front and at one end, of a plate-holder carrier comprising a casing having a plate-holder aperture in its inner end said carrier being slidably arranged in the exposing-tray, two spring-fingers on the closed end of the exposing-tray arranged to project between the foremost plate-holder and the plate-holders in rear thereof as the carrier is withdrawn from the exposing-tray, springs attached to said closed end and constructed to force the plate-holder out of engagement with the fingers when the carrier is drawn out of the exposing-tray, and offset portions at the rear ends of the spring-fingers, substantially as described.

19. In a magazine for cameras, the combination with an outer casing forming an exposing-tray and open at the front and one end, said casing having inwardly-projecting flanges at its top and bottom and an open front, and provided with projections on the under side of said flanges near the open end of said casing, spring-fingers on the closed end of the exposing-tray arranged to project between the foremost plate-holder and those in rear thereof as the carrier is withdrawn from the tray, a plate-holder carrier comprising a casing having a plate-holder aperture in its inner end, said carrier being slidably arranged in the exposing-tray, springs for feeding the plate-holders forward in the carrier, springs for forcing the plate-holders out of engagement with said projection, and springs for forcing the plate-holder to the rear of the exposing-tray when the carrier is drawn out, substantially as described.

20. In a magazine for cameras, the combination with an outer casing forming an exposing-tray and open in front and at one end, of an inner casing forming a plate-holder carrier and having a plate-holder aperture in its inner end, said carrier being slidably arranged in the tray, means for transferring the plate-holders, one at a time, from the front of the carrier to the rear of the tray and from the latter to the rear of the carrier, and guide-strips projecting beyond the inner face of the outer end of the plate-holder carrier, substantially as and for the purpose specified.

21. In a magazine for cameras, the combination with an outer casing forming an exposing-tray and open in front and at one end, of an inner casing forming a plate-holder-carrier aperture in its inner end, said carrier being slidably arranged in said tray, means for transferring the plate-holders, one at a time, from the front of the carrier to the rear of the tray and from the latter to the rear of the carrier, and spring-fingers attached to the closed end of the tray and projecting in front of the back of the latter and in proximity thereto, substantially as and for the purpose specified.

22. In a magazine for cameras, the combination with an outer casing forming an exposing-tray and open in front and at one end, of an inner casing forming a plate-holder carrier and having a plate-holder aperture in its inner end, the said carrier being slidably arranged in said tray, means for transferring the plate-holders, one at a time, from the front of the carrier to the rear of the tray and from the latter to the rear of the carrier, and a spring-plate projecting inwardly from the edge of the outer end of the plate-holder carrier, substantially as and for the purpose specified.

23. In a magazine for cameras, the combination with an outer casing forming an exposing-tray and open in front and at one end, of an inner casing forming a plate-holder carrier and having a plate-holder aperture in its inner end, said carrier being slidably arranged in said tray, means for transferring the plate-holders, one at a time, from the front of the carrier to the rear of the tray and from the latter to the rear of the carrier, spring-fingers attached to the closed end of the tray and projecting in front of the back of the latter and in proximity thereto and projections formed on the back of the carrier near the edge of its open end, substantially as and for the purpose specified.

24. In a magazine for cameras, the combination with an outer casing forming an exposing-tray and open in front and at one end, of an inner casing forming a plate-holder carrier, and having a plate-holder aperture in its inner end, said carrier being slidably arranged in said tray, means for transferring the plate-holders, one at a time, from the front of the carrier to the rear of the tray and from the latter to the rear of the carrier, an inclosing casing open at one end only and slidably arranged over the tray, and carrier, and means for locking the carrier to the inclosing tray, substantially as described.

25. In a magazine for cameras, the combination with an outer casing forming an exposing-tray and open in front and at one end, of an inner casing forming a plate-holder-carrier aperture in its inner end, said carrier being slidably arranged in said tray, means for transferring the plate-holders, one at a time, from the front of the carrier to the rear of the tray and from the latter to the rear of the carrier, an inclosing casing open at one end only and slidably arranged over the tray-carrier, a cover slidably connected to the outer end of the inclosing casing and projecting laterally in rear to the outer end of the latter, and a bolt carried by said laterally-projecting portion of said plate and projecting into the interior of the inclosing casing, said bolt being adapted to be projected into a perforation in the back of the carrier, to lock the latter to the inclosing casing, substantially as described.

26. In a magazine-camera, the combination with an outer casing forming an exposing-tray and open in front and at one end, of an inner casing forming a plate-holder carrier and slidably arranged in said tray, springs arranged to move the plate-holders forward in the carrier, springs for moving the plate-holders, one at a time, rearward in the exposing-tray, means for retaining the foremost plate-holder in the front portion of the tray until the carrier has been drawn out, a cover slidably arranged in the front of the tray, and means for locking said cover to the outer end of the carrier, substantially as described.

In testimony whereof we have hereunto set our hands in presence of two subscribing witnesses.

CHAS. E. HUTCHINGS.
JOHN A. ROBERTSON.
ALBERT MUTSCHLER.

Witnesses:
MINNA STULL,
GEO. W. REILLY.